United States Patent Office 2,849,359
Patented Aug. 26, 1958

2,849,359

HEAT SEALING OF POLYETHYLENE TEREPHTHALATE FILMS

William Mayo Smith, Jr., Cuyahoga Falls, Ohio, assignor to The Firestone Tire & Rubber Company, Akron, Ohio, a corporation of Ohio No Drawing. Application May 13, 1955
Serial No. 508,321

8 Claims. (Cl. 154—139)

This invention relates to the heat sealing together of films of high polymeric esters of normal and branched-chain glycols with terephthalic and isophthalic acids to produce a seamed junction therebetween.

Films of high polymeric esters of normal and branched-chain glycols with isophthalic and terephthalic acids are characterized by extreme high strength and flexibility. However, such films are excluded from many applications because they cannot be heat sealed together for the formation of closure seams, or for the production of tailored articles. The films have high and abrupt melting points so that, if the films are heated to a temperature at which heat sealing might be achieved, they become so soft that they cannot be handled in heat sealing manipulations.

This difficulty has been overcome, in accordance with the present invention, in a heat sealing process in which the faying surfaces of films of high polymeric esters of normal and branched-chain glycols with terephthalic and isophthalic acids which are to be heat sealed together are first lightly coated with substances having an incipient plasticizing action on these high polymeric esters. The faying surfaces are then pressed together and heated to temperatures on the order of 250–280° F., which temperatures, it will be appreciated, are considerably below the melting points of these films. These temperatures are low enough that the films retain sufficient strength for the heat sealing manipulations; and the presence of the incipient plasticizing agents cause the faying surfaces to weld together, notwithstanding the fact that these temperatures are too low to effect welding under ordinary conditions. The heat sealing carried out in this manner leaves the strength of the film virtually unimpaired, and produces only a minimum of distortion or wrinkling in the vicinity of the seal.

As the incipient plasticizing agents to be used in the heat sealing process of this invention, there may be employed any substances which exert an incipient plasticizing action on polyester films of the type referred to. It will be understood that there are no true plasticizers for these films, because of their extremely crystalline character; at most, certain substances exhibit a slight tendency to diffuse into the films, and it is these substances which are referred to as having incipient plasticizing action. Particularly good results are obtained by the use of benzyl alcohol as the incipient plasticizer. Other suitable incipient plasticizers include acetophenone, benzyl methyl ether, glycolonitrile, 4,4'-dihydroxyphenyl sulfide, hydroquinone, resorcinol dibenzoate, resorcinol monobenzoate, glycidyl phenyl ether, cyclohexanone, cyclohexanol, benzyl benzoate, anisole, orthodichlorobenzene, decahydronaphthalene, salicylaldehyde, dimethyl formamide, vanillin, pyrogallic acid, benzene sulfonamide, 4-methyl-3-butene-2-one, phenol, cinnamic acid, benzophenone, catechol, m-dinitrobenzene, phenyl ethyl cinnamate, dibenzofuran and the like. As to the amount of the incipient plasticizer to be used, a sufficient quantity should be used to provide at least a monomolecular film on the faying surfaces. There is, of course, no theoretical maximum, as excessive quantities are squeezed out during the heat sealing manipulations.

With regard to the films which are heat sealed together in accordance with this invention, these are films of high molecular weight linear resinous polyesters of essentially (A) normal or branched-chain glycols containing 2 to 5 carbons with (B) terephthalic or isophthalic acid. The polymerization is carried out to a degree such that the intrinsic viscosity of the polyester is at least 0.5 and the polyester exhibits the phenomena of crystalline X-ray diffraction and of cold drawing. Glycols which may be used include ethylene glycol, trimethylene glycol, tetramethylene glycol, pentamethylene glycol, 1,2-dihydroxy propane, 1,3-dihydroxy butane and the like. It will be understood that mixtures of any of the above glycols in any proportion may also be used, and that the mixtures of isophthalic and terephthalic acids may be used. It will be understood, of course, that the polyester chains may contain small amounts of the residues of other cocondensable bifunctional reactants than those set forth above, provided that they are in sufficiently small amounts (say not over 10%) that the high molecular chains of the resin retain their essential character as polyesters of the aforesaid glycols with terephthalic or isophthalic acid. Such extraneous groups may consist, for instance, in other polyester constituents, for instance polyethylene sebacate, or poly-omega-hydroxycarboxylic acids, or may include polyamide groups such as hexamethylene adipamide groups, or omega-amino-carboxylic acid residues such as the residues of omega-amino-undecylenic acid or of epsilon-amino-caproic acid.

With the foregoing general discussion in mind, there are given herewith detailed examples of the practice of this invention. All parts given are by weight.

EXAMPLES

In the following experiments there was used a polyethylene terephthalate film having a melting point of 482–487° F. and having a thickness of 1½ mils. A heat sealing iron having a glass fabric face impregnated with a high polymer of tetrafluoroethylene (the "Stimson Super Sealer," made by the Cleveland Lathe Machine Co.) was provided, the face temperature of the sealer being kept at 260–270° F. in all experiments. In each experiment, the selected plasticizing agent was smeared lightly on the faying surfaces of the film specimens to be joined, and these faying surfaces were then superimposed and the assembly manually pressed with the sealing iron. Tabulated herewith are the plasticizing agents employed and the operator's qualitative ratings of the seals obtained between the films in each case.

*Table I*

| Reagent used for sealing: | Results |
|---|---|
| Benzyl alcohol | Excellent. |
| Acetophenone | Good. |
| Benzyl methyl ether | Good. |
| Glycolonitrile | Fair. |
| 4,4'-dihydroxydiphenyl sulfide | Good. |
| Hydroquinone | Fair. |
| Resorcinol dibenzoate | Fair. |
| Resorcinol monobenzoate | Good. |
| Glycidyl phenyl ether | Good. |
| Cyclohexanone | Very good. |
| Cyclohexanol | Fair. |
| Benzyl benzoate | Good. |
| Anisole | Excellent. |
| o-Dichlorobenzene | Fair. |
| Salicylaldehyde | Very good. |

| | |
|---|---|
| Dimethyl formamide | Fair. |
| Vanillin | Very good. |
| Pyrogallic acid | Good (but seals are slightly crystalline). |
| Benzene sulfonamide | Fair. |
| 4-methyl-3-butene-2-one | Very good. |
| Phenol | Good. |
| Cinnamic acid | Fair. |
| Benzophenone | Very good. |
| Catechol | Very good. |
| m-Dinitrobenzene | Very good. |
| Phenyl ethyl cinnamate | Very good. |
| Dibenzofurane | Very good. |

In all of the above seals, the strength of the film was virtually unimpaired, and no substantial wrinkling or distortion of the seal or of the adjacent film area was encountered.

What is claimed is:

1. Process of heat sealing together the surfaces of films of polyesters of (A) acids selected from the group consisting of terephthalic and isophthalic acids and mixtures of said acids with (B) glycols selected from the group consisting of straight and branched-chain glycols containing from 1 to 5 carbon atoms and mixtures of said glycols, which comprises coating the faying surfaces of the films with incipient plasticizing agents for said polyesters selected from the group consisting of

| | |
|---|---|
| Benzyl alcohol | Acetophenone |
| Benzyl methyl ether | Glycolonitrile |
| Hydroquinone | Resorcinol dibenzoate |
| Resorcinol monobenzoate | Glycidyl phenyl ether |
| Cyclohexanone | Cyclohexanol |
| Benzyl benzoate | Anisole |
| o-Dichlorobenzene | Salicylaldehyde |
| Dimethyl formamide | Vanillin |
| Pyrogallic acid | Benzene sulfonamide |
| 4-methyl-3-butene-2-one | Phenol |
| Cinnamic acid | Benzophenone |
| Catechol | m-Dinitrobenzene |
| Phenyl ethyl cinnamate | Dibenzofurane |
| 4,4'-dihydroxydiphenyl sulfide | | and then pressing the faying surfaces together and heating them at temperatures from 250° to 280° F.

2. Process of heat sealing together the surfaces of polyethylene terephthalate films, which comprises coating the faying surfaces of the films with incipient plasticizing agents for the polyethylene terephthalate selected from the group consisting of

| | |
|---|---|
| Benzyl alcohol | Acetophenone |
| Benzyl methyl ether | Glycolonitrile |
| Hydroquinone | Resorcinol dibenzoate |
| Resorcinol monobenzoate | Glycidyl phenyl ether |
| Cyclohexanone | Cyclohexanol |
| Benzyl benzoate | Anisole |
| o-Dichlorobenzene | Salicylaldehyde |
| Dimethyl formamide | Vanillin |
| Pyrogallic acid | Benzene sulfonamide |
| 4-methyl-3-butene-2-one | Phenol |
| Cinnamic acid | Benzophenone |
| Catechol | m-Dinitrobenzene |
| Phenyl ethyl cinnamate | Dibenzofurane |
| 4,4'-dihydroxydiphenyl sulfide | | and then pressing the faying surfaces together and heating them at temperatures from 250 to 280° F.

3. Process of heat sealing together the surfaces of polyethylene terephthalate films, which comprises coating the faying surfaces of the films with benzyl alcohol and then pressing the faying surfaces together and heat-them at temperatures from 250° to 280° F.

4. Process of heat sealing together the surfaces of polyethylene terephthalate films, which comprises coating the faying surfaces of the films with anisole and then pressing the faying surfaces together and heating them at temperatures from 250° to 280° F.

5. Process of heat sealing together the surfaces of polyethylene terephthalate films, which comprises coating the faying surfaces of the films with cyclohexanone and then pressing the faying surfaces together and heating them at temperatures from 250° to 280° F.

6. Process of heat sealing together the surfaces of polyethylene terephthalate films, which comprises coating the faying surfaces of the films with salicylaldehyde and then pressing the faying surfaces together and heating them at temperatures from 250° to 280° F.

7. Process of heat sealing together the surfaces of polyethylene terephthalate films, which comprises coating the faying surfaces of the films with vanillin and then pressing the faying surfaces together and heating them at temperatures from 250° to 280° F.

8. Process of heat sealing together the surfaces of polyethylene terephthalate films, which comprises coating the faying surfaces of the films with 4-methyl-3-butene-2-one and then pressing the faying surfaces together and heating them at temperatures from 250° to 280° F.

References Cited in the file of this patent

UNITED STATES PATENTS 2,673,826   Ness _____ Mar. 30, 1954